United States Patent [19]
Ferruzzi

[11] Patent Number: 4,545,709
[45] Date of Patent: Oct. 8, 1985

[54] MACHINE FOR THE ENCIPHERMENT OF KEYS

[75] Inventor: Claudio Ferruzzi, Faenza, Italy

[73] Assignee: Industrie Metaimeccaniche Perugia I.M.P. S.p.A., Pievaiola, Italy

[21] Appl. No.: 477,718

[22] Filed: Mar. 22, 1983

[30] Foreign Application Priority Data

Apr. 5, 1982 [IT] Italy .................. 3391 A/82

[51] Int. Cl.[4] ........................... B23C 1/16
[52] U.S. Cl. .................. 409/83; 51/100 R; 76/110
[58] Field of Search .................. 409/81–83, 409/87; 76/110; 83/565, 9.7; 51/100 R, 215 R, 217 A

[56] References Cited

U.S. PATENT DOCUMENTS

| | | | |
|---|---|---|---|
| 1,895,849 | 1/1933 | Haubroe | 409/82 |
| 3,196,750 | 7/1965 | Moessner et al. | 409/83 |
| 4,092,806 | 6/1978 | Wich | 409/81 |
| 4,251,173 | 2/1981 | Saucedo | 51/100 R X |

Primary Examiner—William R. Briggs
Attorney, Agent, or Firm—Guido Modiano; Albert Josif

[57] ABSTRACT

The machine comprises a milling cutter of the so-called cup type whereto a manually movable bracket is articulated. The bracket has journalled thereon a stand having the reference key clamps mounted thereon and the clamps for the key blank to be milled. The keys lay in two respective parallel planes extending perpendicularly to the bracket articulation axis and containing the cutter rotation axis and the contact point of a feeler arranged to sense the reference key profile, respectively.

9 Claims, 6 Drawing Figures

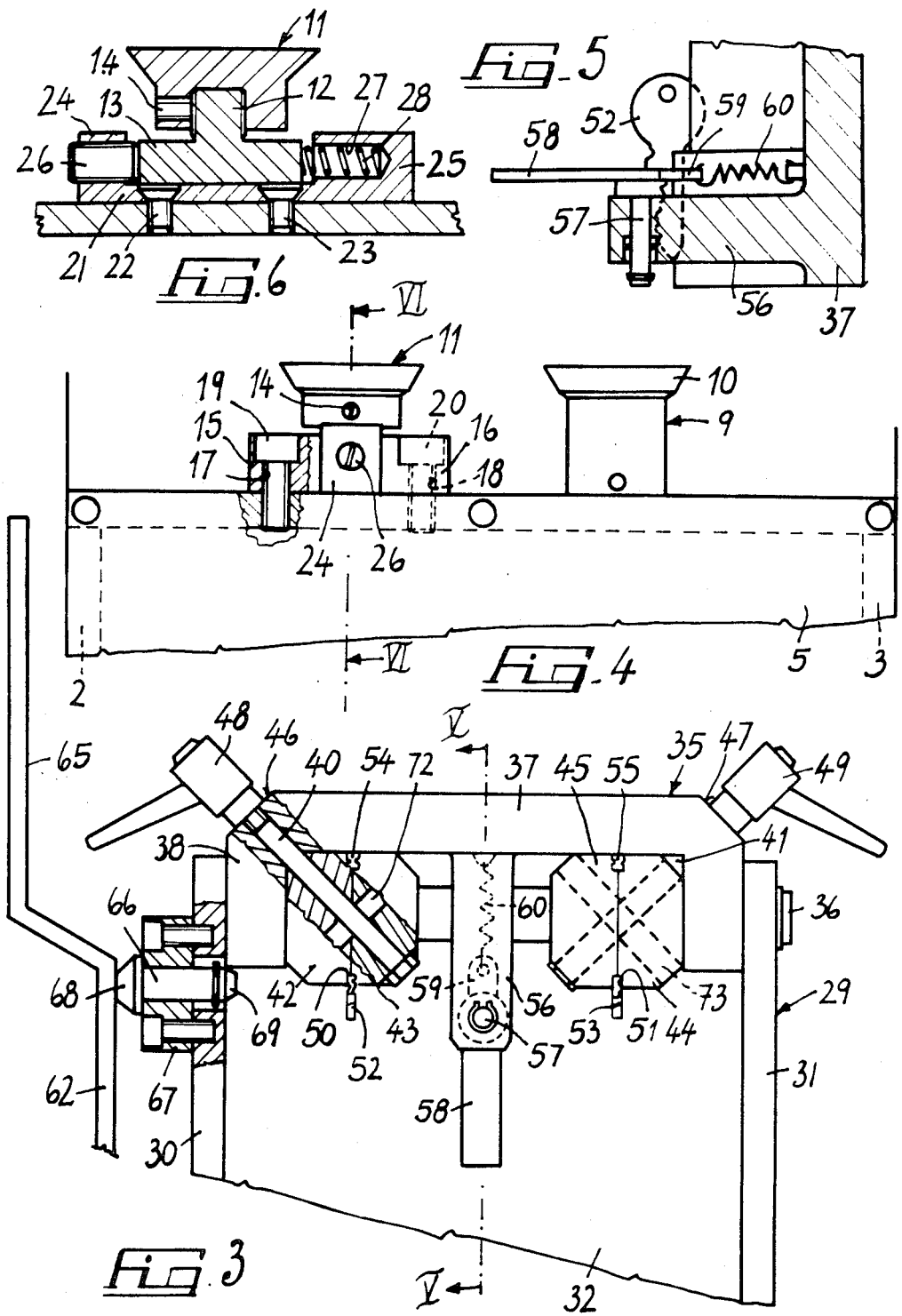

MACHINE FOR THE ENCIPHERMENT OF KEYS

BACKGROUND OF THE INVENTION

This invention relates to a machine for the encipherment of keys, in particular for transferring a reference key profile to a key blank.

It is a known fact that to reproduce keys, copying machines are used which comprise, in general, a stand on which are set up, in alignment relationship, both a key blank to be worked and a reference key, a cutter for milling the blank key, and a feeler which follows the profile of the reference key.

The stand is articulated such that the key blank can be brought close to the cutter and moved along in accordance with feeler advance movement along the reference key profile.

With prior copying machines, the stand journalling poses some construction problems, especially as regards the requirement that the key be movable past the cutter, which is usually of the straight tooth type.

Moreover, with conventional machines, the motion is transmitted to the cutter through a drive, usually of the belt type, which involves the provision of additional supports, making the construction more complicated and cumbersome.

SUMMARY OF THE INVENTION

Accordingly the task of the invention is to provide a machine as indicated in the preamble, which is more compact in size, while ensuring equally high duplicating or milling performance features.

Within that task it is an object of this invention to provide such a machine, which is reliable in operation, versatile application-wise, in relation to the key types it can accommodate, and safe to operate.

According to one aspect of the invention the above task and object, as well as yet other objects which will become more apparent hereinafter, are achieved by a machine of the specified kind characterized in that it comprises a cup cutter keyed to a shaft driven by an electric motor, a bracket articulated about a perpendicular axis to the cutter rotation axis, a feeler on one side of the cutter and located at the same distance as said cutter away from the bracket articulation axis, a stand journalled to said bracket about a parallel axis to the bracket articulation axis, a pair of clamps located on the stand for clamping the key blank and reference key along perpendicular planes to the bracket articulation axis and containing the cutter rotation axis and feeler, said keys being set at an angle with respect to the cutter rotation axis in the 15° to 45° range.

BRIEF DESCRIPTION OF THE DRAWINGS

Further features of the invention will be more clearly understood from the following description of an embodiment thereof, illustrated in the accompanying drawings, where:

FIG. 3 is a view taken along the line III—III of FIG. 2;

FIG. 4 is a plan view showing the machine cutter and feeler;

FIG. 5 is a sectional view taken along the line V—V of FIG. 3; and

FIG. 6 is a sectional view taken along the line VI—VI of FIG. 4.

DESCRIPTION OF THE PREFERRED EMBODIMENTS

Figure 1:
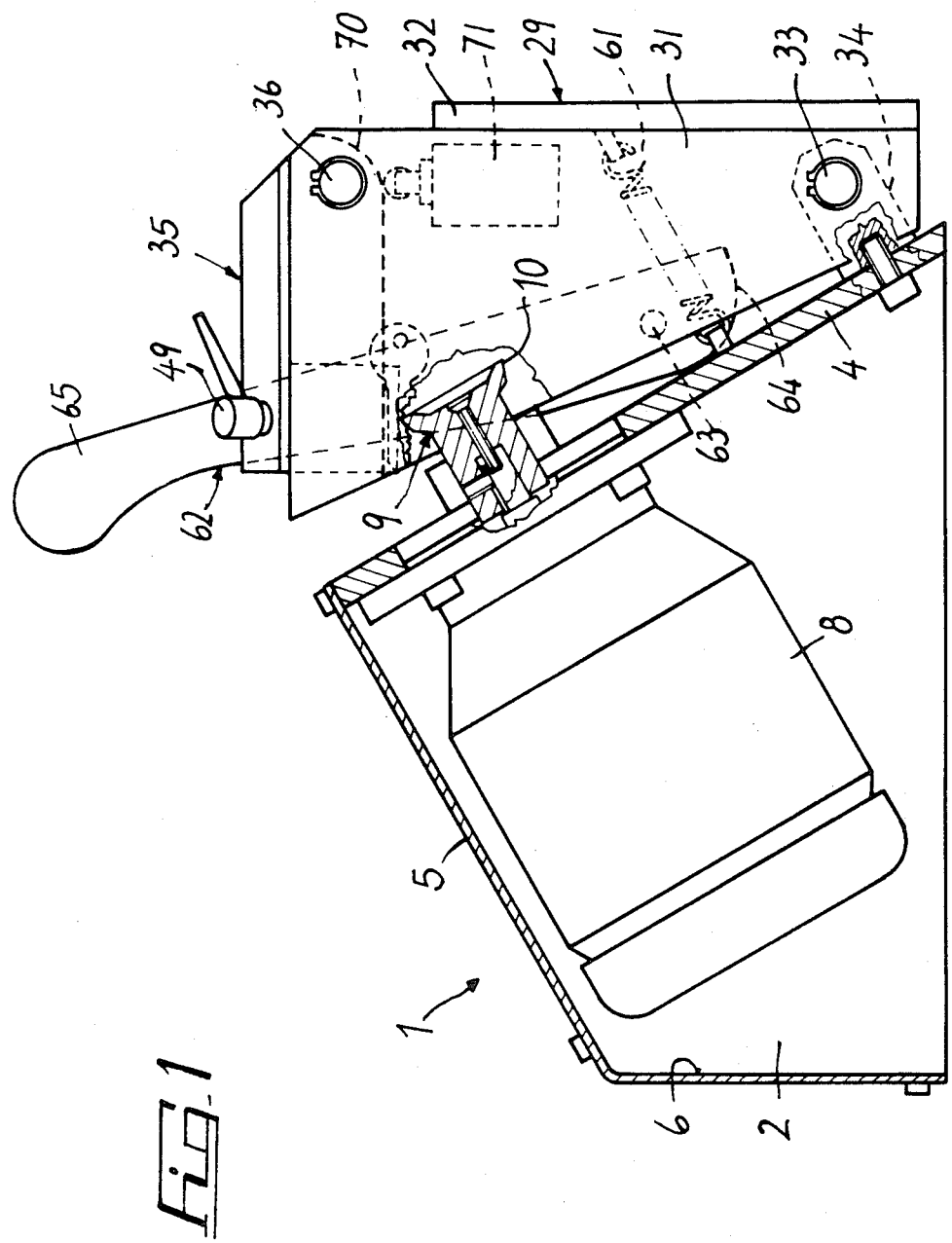
FIG. 1 is a side elevation and sectional view of a machine according to the invention for duplicating or copying keys of flat configuration.
Figure 2:
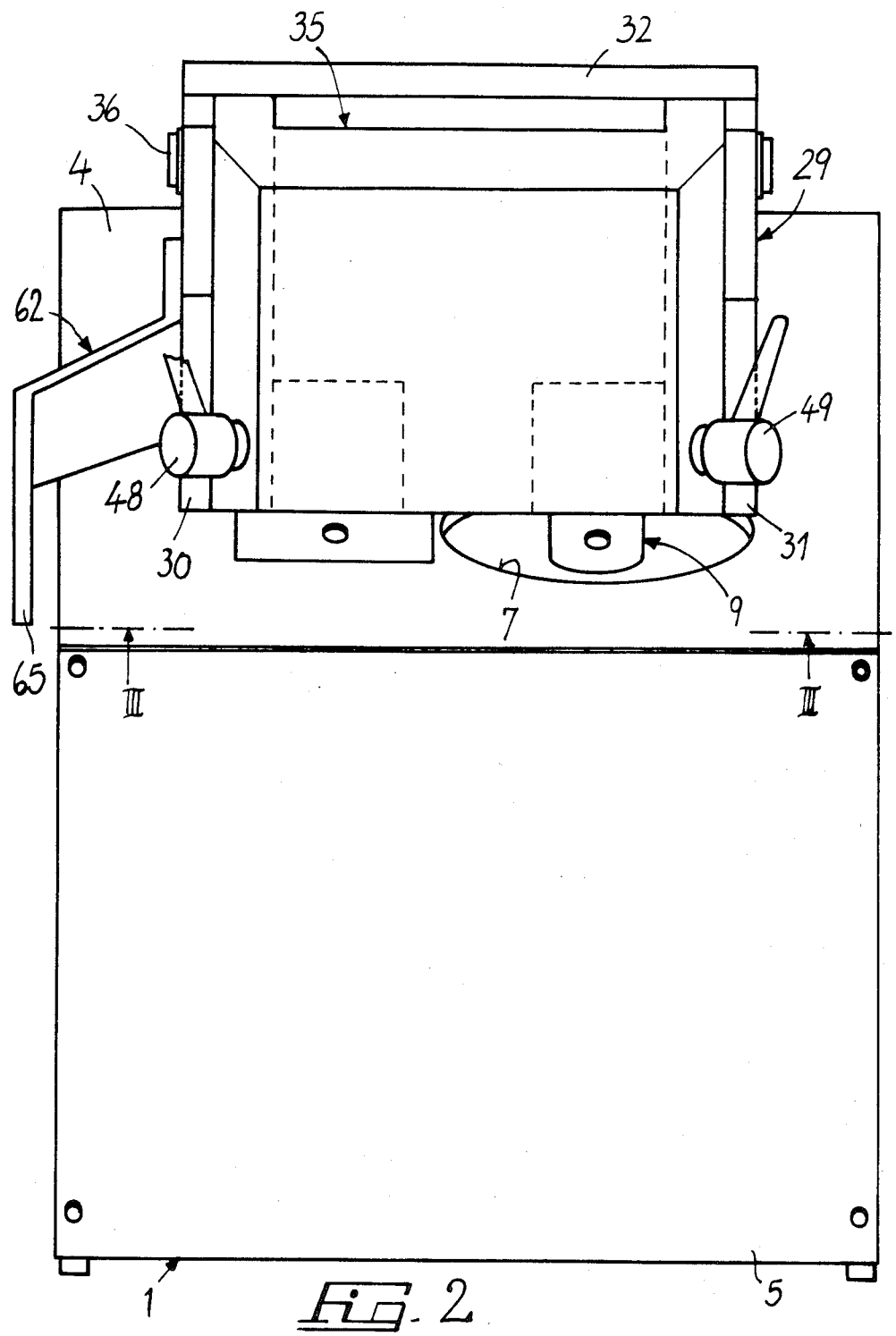
FIG. 2 is a plan view of the machine of FIG. 1.

The inventive machine comprises a box-like body 1 including two sidewalls 2,3 interconnected at the front by a plate 4 inclined over a horizontal plane, e.g. by an angle of 60°.

Attached to the top edge of the front plate 4 is a casing 5, which is also secured to the peripheries of the sidewalls 2,3 such as to enclose a space 6.

Formed through the front plate 4 is a circular opening 7, whereat an electric motor 8 accommodated in the space 6 is centered and flange-fitted.

Keyed to the output shaft of the electric motor 8 is a cutter 9, substantially of the conical cup type, having an annular tooth formation 10 with outward cutting edges, which form an angle of about 20° with the cutter axis of rotation.

Attached on one side of the cutter 9, as shown best in FIG. 4, is a feeler including a frustoconical body 11 of a shape and dimensions identical to those taken by the revolving cutter 9.

The feeler 11 is threaded to a threaded shank 12 projecting perpendicularly to the plate 4 from a block 13 and being rotatively securable to said shank by means of a set pin 14. The block 13 has two side extensions 15,16 which bear onto the front plate 4, and having slots 17,18 extending in vertical planes formed therein. Led through the slots 17,18 are screws 19,20 which, by engaging in the front plate 4, enable the block 13 to be fastened.

The block 13, as shown in FIG. 6, does not rest on the front plate 4, but has located thereunder a small bar 21 fastened to the plate by means of screws 22,24. The bar 21 is provided, at opposing end portions protruding above and below the block 13, with respective bosses 24,25; threaded into the boss 24 is an Allen screw 26, whilst in the boss 25, there is formed a recess 27 accommodating a compression spring 28 acting on the block 13. Expediently, the Allen screw 26 and spring 28 are aligned together. It will be appreciated from the foregoing description that, by loosening the screws 19,20 and manipulating the Allen screw 26, it becomes possible to displace the block 13 along the slots 17,18 such as to move the axis of the feeler 11 to the same plane as the axis of the cutter 9. Adjustment of the feeler along its own axis is accomplished by threading in or out the feeler along the threaded shank 12 and locking it against rotation through the set screw 14, at a position where the corner edge 11a is coplanar with that of the cutter 9.

Articulated on the front of the box-like body 1 is a bracket, generally indicated at 29 and comprising two shoulders 30,31 configured as right angular triangles and rigidly interconnected by a cross-piece 32. The shoulders 30,31 have a rod 33 led through them, at their lower vertices, which rod is journalled in ears 34 secured in the proximities of the bottom edge of the front plate 4. The shoulder shape is such that, with the bracket located close behind the front plate 4, the cross-piece 32 is nearly vertical. At the right angle formed by the front and top edges of the shoulders 30,31, there is journalled a cover element 35 with its axis formed by a rod 36. The cover 35 provides a stand for the reference key and key blank, as will be explained hereinafter.

The cover 35 comprises a flat upper portion 37, whence there depend two side parallel flanges 38,39 adjacent the shoulders 30,31. At the corners formed by the flanges 38,39 with the flat portion 37 there are passed respective bolts 40,41, which project along the bisecting lines of such corners. The bolts are arranged to cross respective jaw pairs 42,43 and 44,45 diagonally which have a prismatic shape and constitute the two clamps for clamping the reference key and key blank tight. The jaws 42,43 have their top faces in contact with the bottom face of the portion 37, being thus prevented from rotating. The outward jaws 42,44 bear laterally against the flanges 38,39. The heads of the bolts bear onto the jaws 43, 45, and their shanks are passed through the cover 35 at 45° bevels formed at the corners and indicated at 46,47. Threaded on the outward end portions of the bolts with respect to the cover are clamping levers 48,49, the operation whereof enables the jaw pairs 42-45 to be moved to and from each other.

In the embodiment shown, formed along the adjacent bottom edges of the jaw pairs are notches or recesses 50,51 intended for receiving the backs of the reference key 52 and key blank 53. Similar recesses 54,55 are provided on the opposing top edge, which are shaped to accommodate keys having different configurations.

Between the two clamps, there extends, from the portion 37, a lug 56, whereto a tab 58 is articulated through a pin 57. Made rigid with said tab, on the remote side from the pin 57, is a lug 59 to which is hooked a spring 60, also hooked to the bottom face of the portion 37. The spring 60 holds the tab 58 normally perpendicular to the portion 37, from which position it may be rotated horizontally onto the clamps to provide a reference abutment during the key clamping. The bracket 29 is normally held against the front plate 4 by a spring 61 intervening between the crosspiece 32 and the plate.

The bracket 29 is driven rotatively about the axis 33 by a lever 62 articulated to the shoulder or sidewall 30 by means of the pivot pin 63. The lever 62 has a bottom end 64 configured as a cam contacting tangentially the front plate 4. One portion of said cam is concentrical to the pin 63 and the remaining portion thereof has a gradually increasing radius relatively to said pin. By virtue of the particular profile of the end 64, as the lever 62 is gripped through the handle 65 and turned in a clockwise direction as shown in FIG. 1, against the bias of the spring 61, an initial no-load distance is first travelled, whereafter the bracket 29 is moved away from the plate 4.

In order to prevent the key blank 53 from violently striking the cutter 9, a mechanism is provided which enables, at least during the contacting movement of the blank with the cutter, a progressive downward movement of the cover 35. The mechanism comprises a pin 66 guided in a block 67 which is fastened to the sidewall 30. The pin 66 is perpendicular to the sidewall 30 and has its opposed ends 68,69 of conical shape. On the outward end 68, there acts a lever which, with the machine inoperative, holds the pin against the sidewall 30 in a cut-off position whereby the cover 35 is prevented from moving downwards and the flange 38 will rest onto the conical end 69.

The machine described hereinabove operates as follows. The keys 52,53 are first clamped between the jaw pairs 42,43 and 44,45. For this purpose, by manipulating a handgrip, not shown in the drawings, the cover 35 is tilted outwards and the reference key 52 is introduced in the notch 50. Then the tab 58 is tilted over it and the key is slid in the notch 50 until it abuts with the tooth 53a (FIG. 5) against the tab 58. The key is then locked by operating the lever 48. Similarly, the key blank 53 is then dealt with, for the positioning whereof the tab 58 is, of course, turned in the opposite direction.

After performing these preliminary operations, the cover 35 is overturned in the position where the flange 38 bears onto the end 69 of the pin 66, and the feeler 11 and cutter 9 have yet to engage with the respective keys. As the cover 35 is pivoted, through a cam 70 formed on the flange 39 around the pin 36, a microswitch 71 is actuated which starts the motor 8 to cause the cutter to rotate.

Then the lever 62 is operated. Through an initial angle of its pivotal movement, which corresponds to the portion of the cam 64 concentric with the pin 63, the lever 62 will disengage itself from the pin 66, thus allowing it to move outwards under the weight of the cover 35 applied on the end 69. It should be noted that the outward movement of the pin 66 is controlled by the inhibiting action of the lever 62 on the other conical end 68, which enables the cover to be lowered gently until the reference key is stopped against the feeler 11. As the feeler engages with the first notch, the key blank is simultaneously indented by the cutter 9, the indenting occurring in the proximity of the tooth 53a.

A successive pivotal movement of the lever 62, owing to the increasing radius of the cam 64, will cause the bracket 29 to move away from the front plate 4 and the feeler 11 to slide along the tooth formation of the reference key, while at the same time, the cutter 9 cuts a like tooth formation into the key blank.

Upon completion of the key machining, the cover is again tilted outwards to cause the cutter to stop, and the lever 62 is released to allow the bracket 29, under the pull exerted by the spring 61, to return to its initial position where it bears on the front plate 4, thus returning the pin 66 to its cut-off position. The positioning and machining operations for a fresh key will follow the same procedure as described above.

A peculiar feature of this invention is that access to the cutter from the outside during the machining operations is effectively prevented, thus providing an important safety feature.

A substantial advantage of the machine described above resides in the fixed mount of the motor, which results in a considerable construction simplification.

The invention enables the milling of flat configuration differring from that shown by way of example. In particular, keys with tooth formations along opposed edges may be milled. Such keys may be positioned in the notches 54,55 after pivoting the clamps through 180° and inserting the bolts 40,41 through holes 72,73 which are offset by 90° relatively to those provided for clamping flat keys.

In practicing the invention, the materials used, and the shapes and dimensions, may be any selected ones; advantageously, the box-like body 1, bracket 29, and cover 35 are single-piece constructions.

I claim:

1. A machine for the encipherment of keys in particular for transferring a reference key profile to a key blank, characterized in that it comprises a cup cutter keyed to a shaft driven by an electric motor, a bracket articulated about a perpendicular axis to the cutter axis of rotation, a feeler with an axis on one side of the cutter and located at the same distance as said cutter away from the bracket articulation axis and having a shape contacting the reference key substantially the same as said cutter, a stand journalled to said bracket about a parallel axis to the bracket articulation axis, a pair of clamps on the stand for clamping and locating a key blank and reference key in respective parallel planes containing the cutter rotation axis and the feeler axis which planes are perpendicular to the bracket articulation axis, said keys being set at an angle in the 15° to 45° range when juxtaposed with said cutter and feeler.

2. A machine according to claim 1, characterized in that the cutter is keyed to the output shaft of an electric motor accommodated within a box-like body and protruding out of a front plate thereof at an inclination angle in the 15° to 45° range.

3. A machine according to claim 2, characterized in that the bracket comprises two plane-parallel shoulders interconnected by a crosspiece and is driven, against the force of a bias spring, by a lever articulated to one shoulder and having one end arranged to function as a handgrip and the opposed end profiled cam-like and contacting the front plate of the box-like body.

4. A machine according to claim 1, characterized in that the feeler comprises a frustoconical body having the same rotational symmetry as the cutter about a parallel axis to the cutter axis, said feeler being attached to a front plate of a box-like body in an adjustable way in the direction of the symmetry axis thereof and perpendicularly to said axis in the plane of the reference key.

5. A machine according to claim 4, characterized in that the feeler can be threaded onto a threaded shank projecting perpendicularly to the front plate of the box-like body from a block having two side extensions for resting onto the front plate, wherethrough slots are formed to extend on perpendicular planes to the bracket articulation axis, screws being passed through said slots for fastening the block to engage in the front plate.

6. A machine according to claim 5, characterized in that arranged under the block is a small bar made rigid with the front plate which has two bosses projecting above and below the block, an allen screw being threaded into one of said bosses whilst engaged with the other of said bosses is a cylindrical spring aligned with said Allen screw parallel with said slots, said Allen screw and spring acting on said block at opposed sides thereof.

7. A machine according to claim 2, characterized in that the stand normally bears onto the conical end of a pin led parallel to the bracket articulation axis through one shoulder thereof, the outward end of said pin being also conical and the actuating lever being adapted to engage therewith, said lever being adapted, through one portion of its pivotal movement, to allow the pin to move out and the stand to move down until the reference key stops against the feeler, while holding the bracket stationary.

8. A machine according to claim 1, characterized in that the stand is configured as a cover with a flat portion whence there extend perpendicularly thereto two flanges defining right angles whereat the clamps are located for clamping the reference key and key blank, between said clamps there extending an articulated tab which, from a neutral position, can be tilted alternately over the two clamps to provide a reference opposition for the reference key and key blank, an elastic means being provided to return and hold said tab into said neutral position.

9. A machine according to claim 8, characterized in that each clamp comprises a pair of substantially prismatic jaws having two respective faces in contact with said flat portion, one of said jaws bearing against the respective flange and the other acting as a shoulder for a bolt led through both jaws and the stand along the bisecting line of the angle defined between said flat portion and said flange, a tightening lever being threadable onto the outward portion of said bolt.

* * * * *